United States Patent [19]

Rohrbach et al.

[11] 3,973,980

[45] Aug. 10, 1976

[54] PROCESS FOR THE HEAT TREATMENT OF MATERIAL IN DUST FORM

[75] Inventors: Rudolf Rohrbach; Gerhard Rohrbach, both of Dotternhausen; Helmuth Y. Rechmeier, Balingen, all of Germany

[73] Assignee: Rudolf Rohrbach, Dotternhausen, Germany

[22] Filed: Dec. 18, 1973

[21] Appl. No.: 425,779

[30] Foreign Application Priority Data

Dec. 19, 1972 Germany............................ 2262213

[52] U.S. Cl................................. 106/100; 432/13; 432/14
[51] Int. Cl.[2]......................................... C04B 7/02
[58] Field of Search.......................... 432/58, 14–16, 432/106, 61, 66, 13; 106/100

[56] References Cited
UNITED STATES PATENTS

| | | | |
|---|---|---|---|
| 1,605,279 | 11/1926 | Pike | 106/100 |
| 3,744,962 | 7/1973 | Ritzmann | 432/16 |

FOREIGN PATENTS OR APPLICATIONS

| | | |
|---|---|---|
| 1,213,337 | 3/1966 | Germany |
| 974,876 | 5/1961 | Germany |

Primary Examiner—Patrick P. Garvin
Assistant Examiner—John P. Sheehan
Attorney, Agent, or Firm—Haseltine, Lake & Waters

[57] ABSTRACT

A process for the heat treatment of material in dust form in a rotary kiln installation having a condenser connected on the output side of the rotary kiln. One or more heat exchangers are connected on the input side of the kiln.

5 Claims, 2 Drawing Figures

PROCESS FOR THE HEAT TREATMENT OF MATERIAL IN DUST FORM

BACKGROUND OF THE INVENTION

With the modern heat treatment processes for material in dust-like form, the material is generally calcined or burnt in rotary kilns. In front of the kilns are connected heat exchangers for the recovery of the heat, which is contained in the waste gases of the kilns.

For endothermal processes as for example the manufacture of cement, various heat exchangers have been proposed for this purpose, as for example, cyclone preheaters, and shaft preheaters. Some of these use the counter-current method, whereas others use the unidirectional flow method.

With these calcining plants, the heat is produced at a location where it is not actually required, — in the sintering zone of the rotary kiln. The transporting of the heat to the position where it is to be used, — to the deacidifying zone, and further for preheating purposes, is carried out in the manner which so far has not been technically satisfactory, in particular to conducting all the combustion gases through the rotary kiln. In this case, the gases are contained in these waste gases and which are driven out of the untreated material, such as sulphur dioxide and carbon dioxide, as well as the vaporizable, mineral constituents, such as alkali oxides, chlorides and sulphates. The gases are also entrained and lead to the colder section of the kiln or in the lower part of the heat exchanger to formations of deposits which sensibly disrupt the calcining operation in practically all works. In addition, the sulphur quantities which are introduced with the raw material and the fuel are combined in the kiln with lime. As a result, the sulphates thus forming cannot be removed with the waste gases and, by circulations in the kiln, lead to the lowering of the melting point of the clinker. It has been found that such sulphur cycles are able to lower the melting point of the raw material by some hundreds of degrees, so that often there are considerable interruptions in the calcining operation because of these low-melting compounds, due to ring formations and excessive deposits.

In addition, it has been found in connection with these systems that infiltrated air occurs at the inlet and outlet of the rotary kiln. This is caused by the difficulty in sealing off the rotating parts from the fixed parts, through the method of procedure. The infiltrated air increases the fuel requirements of the system, firstly because it replaces the hot air which can be utilized from the condenser by cold air, and secondly because it has to be heated to process temperature. This leaves the system at higher temperature, and as a consequence causes an additional loss of heat.

The efficiency of such kilns is determined by the quantity of fuel which can be burnt per unit of time in the kiln. The fuel quantity depends on the air quantity which can be sent through per unit of time, and also on the kiln volume charging M, expressed, for example, in tons of clinker per 24 hours. The two values, the fuel quantity and the air quantity, produce the fuel heat flow. According to the prior art, the highest possible fuel heat flow amounts to $Q_{Br}=0.75 \cdot 10^6 D_i^3$ (kcal/$h$) ($D_i$ = internal diameter of the kiln), see R. Frankenberger: "Ofenabmessungen, Durchsatz and Waermebedarf von Schwebegas-Warmetauscheroefen", Zement-Kalk-Gips 1967, pages 453–458. According to this same work, the maximum kiln output with the present-day operating methods is $M = 1.7554 \cdot V_i$ ($V_i$ = internal volume of the kiln). The burning or calcining efficiency is inter alia limited by the fact that, with a constantly increasing air capacity, the speed of the gases in the kiln finally becomes so high that the powdered material in the kiln is also entrained. As a consequence it is no longer possible to maintain any regulated calcining operation. The fuel heat flow is, therefore, determined in practice by the highest permitted gas velocity in the kiln.

For these reasons, always larger kilns have to be constructed for increasing outputs. This in turn means higher driving costs, and also more difficult lining operations, as well as an increased tendency to disruptions in the burning operation caused by ring formations.

In the aforementioned work by Frankenberger, it is shown in FIG. 2 how the kiln volume has to be increased when the capacity is raised.

With one known process for the manufacture of cement clinkers, the endothermal process of the deacidification is partly carried out in a fluidizing furnace separated from the rotary kiln (German Patent No. 1,251,688). In this arrangement, the fuel is supplied to the fluidizing furnace, for example, in the form of oil shale. The quantity of fuel to be introduced in this case is, however, limited by the fact that the air for combustion, which is to be conveyed through the rotary kiln, must not exceed a certain velocity, at which the powder is also entrained. It is, of course, possible for the rotary kiln to be chosen so as to be considerably shorter for the same capacity. However, because of the limitation of the gas velocity, the diameter of the rotary kiln must increase with increasing capacity, so as to keep the gas velocity below a certain limiting value.

Accordingly, it is an object of the present invention to improve the loading, i.e. the specific capacity of a rotary kiln installation, in tons per cubic meter of kiln volume and permit of time.

SUMMARY OF THE INVENTION

The object of the present invention is achieved by providing a process as initially described, in which the endothermal processes are carried out in a conventional manner in apparatus which is separated from the rotary kiln. In the latter, there is only produced the heat quantity which is necessary for achieving the process temperature and for covering the heat losses.

In one preferred embodiment of the process, according to the present invention, two heat exchangers are connected in a conventional manner, on the input side of the rotary kiln. One heat exchanger is fed with the waste air of the condenser, whereas the other is fed with the waste gases of the rotary kiln. The endothermal processes takes place in the heat exchanger to which the waste air of the condenser is fed. The waste air here serves in a conventional manner, for the combustion of the fuel for heating the heat exchanger. The raw material which is delivered into the heat exchanger, to which the waste gases from the rotary kiln are supplied, is thereafter fed to the first-mentioned heat exchanger.

An arrangement is known for the manufacture of cement in a rotary kiln, which is followed by a condenser and which has two heat exchangers connected on its input side. The hot waste air from the condenser is supplied to the one heat exchanger, and the waste gases of the rotary kiln are supplied to the other heat exchanger (German Patent No. 974,876). With another known process for the manufacture of cement clinker, raw flour is fed to a heat exchanger operated with waste air from the condenser. Clay is supplied to a heat exchanger operated with the waste gas from the kiln (German Paten No. 1,213,337). It is necessary, in this connection, to avoid the kiln gas containing carbon dioxide which reacts with the lime-containing raw flour or meal, to form calcium carbonate. The resultant effect is that subsequently additional heat would have to be used for the subsequent deacidification of the lime.

The rotary kiln of apparatus known in the art for the heat treatment of materials of all types, is preceded by a preheating chamber which is heated with burners (German Offenlegungsschrift No. 1,508,510). These burners are supplied from the condenser connected on the output side of the rotary kiln with hot air to serve as air for combustion. Connected before the preheating chamber, is a drying chamber to which the hot combustion gases of the preheating chamber are supplied by means of a fan. With this arrangement, there is no heat exchanger connected in parallel and on the output side of the rotary kiln.

The conveying of hot waste air from a condenser by means of a fan has always been unsuccessful, because even with a previous dust extraction, the dust contained in the exhaust air from the condenser in a short time, causes wear both in the dust-extractor and on the blades of the fan. However, it has surprisingly been found that if the waste air from the condenser is conveyed through a fan or blower located after the heat exchanger to which this waste air is admitted, even ultra-fine clinker dust is not conveyed through all cyclone stages with the gas to the blower. Consequently, there is no wear on this blower.

It is know in the art that sulphates in the sintering zone are split into the corresponding metal oxides, as well as $SO_2$ or $SO_3$. These gases are again strongly combined in the deacidifying zone with the forming quicklime (CaO). This zone for reuniting $SO_2$ with CaO, normally lies in the rotary kiln and in the last section of the preheater.

However, with the process according to the invention, the deacidifying zone lies outside the rotary kiln and also outside the range of influence of $SO_2$-containing gases, — in the heat echanger, which is operated with the waste air from the condenser. The $SO_2$-containing kiln waste gases flow through the other heat exchanger, in which it is possible for such a quantity of material to be passed through that no acidification takes place at any stage. These waste gases are freed by known processes from $SO_2$ after the heat exchanger.

Consequently, the invention provides that the heat exchanger operated with the waste gases from the kiln, is charged with such an amount of raw flour or powder that there is no deacidification of the latter. The sulphur dioxide is not combined and can be subsequently removed by conventional methods from the gases. In this way, when suplhur-containing raw materials are present, the forming sulphur dioxide can be easily removed from the system.

In another embodiment of the invention, a high-percentage of limestone powder is introduced into the heat exchanger and heated with the waste air from the condenser. The clay component required for the production of the clinker is introduced into the heat exchanger and heated with the waste gas of the kiln. The high-percentage limestone powder and the clay component are thereafter introduced into the combustion air pipe coming from the condenser, and the homogenisation of the mixture takes place in the heat exchanger which is heated with the waste air from the condenser.

Since the clay component does not contain any lime, the waste gases containing sulphur dioxide and coming from the rotary kiln are not again combined in the heat exchanger.

In DIN 1164, Paragraph 1, wording under 1.1, it is stated: "For the manufacture of Portland cement clinkers, the raw materials in the raw flour, or powder, or raw sludge, must be finely divided and intimately mixed, and must be separately prepared". Contrary to this belief held by the technical people concerned, it has been shown that, with the embodiment of the invention, an excellent homogenisation occurs, and this permits the calcining of a clinker of high quality with a high lime standard.

This process has the particular advantage that when different types of cement are to be manufactured in one factory, the raw powder components necessary for this purpose, do not have to be kept in store in homogenised form in correspondingly large silos. Instead, it is possible that by supplying high-percentage limestone by weight to the first heat exchanger, and by measured supply to the second heat exchanger of the constituents which are important for the composition of the clay component, such as silicon dioxide, aluminium oxide and iron oxide in the form of sand, clay or iron ore, any arbitrary variation in the cement composition can be carried out in an extremely short time. The clinker for special cements and also the different raw powders for the production of such special cements then no longer have to be kept in storage. The composition of such cements is determined by altering the proportions before the heat exchangers, and the calcined clinker can then immediately be ground to form the corresponding cements.

Another preferred embodiment of the process according to the invention provides that only a single heat exchanger is connected before the rotary kiln. This exchanger is supplied the waste air from the condenser, and some of the kiln waste gases are continuously removed through a by-pass. The other part of the kiln waste gases is then preferably used directly for drying the raw material.

It is obvious that the system according to the invention can also be operated with other heat exchangers than cyclone-type heat exchangers.

For the removal of the disrupting, vaporizable constituents, such as alkali oxides, chlorides and sulphates, from the waste gases of the kiln, many different processes are known. These include, among others, the use of a by-pass, through which a certain part of the hot kiln waste gases is removed from the system with the harmful constituents which are contained therein. This process has the serious disadvantage that a relatively large gas quantity has to be removed from the kiln system, in order to remove the harmful constituents, because these constituents are present in very low concentration in the gas, because of the high gas quantity formed in the kiln. As shown in the article by F. W. Locher, S. Sprung and D. Optiz — "Reaktion in Bereich der Ofengase"-Zement-Kalb-Gips, Issue 1/1972, pages 1-12, this has the additional serious disadvantage that a large proportion of dust is discharged from the kiln system with the gases which are branched off through a by-pass, since the harmful constituents are deposited on the dust which has to written off as a loss. The dust quantities are estimated at 50 to 117 g/kg of clinker, corresponding to about 5 to 11.7% of the production. It has been, of course, attempted to use only the by-pass at intervals, in order to remove smaller gas quantities with more highly concentrated harmful constituents. In time, however, where concentration occurs, there continue to be disruptions in the burning operation.

In summary, the installations according to the prior art have the following disadvantages:
1. The reaction heat is produced at an unfavorable location.
2. The transporting of the heat is only possible by rotary kilns of particularly large dimensions, because of the transport of gas which is connected therewith. Increases in capacity necessitate kilns with ever larger diameters.
3. Entry of infiltrated air at the inlet and outlet of the kiln increase the heat consumption during the burning operation.
4. Voltatile constituents of the material being burnt or calcined continue to come into contact with cool burning material, whereby cycles are established which disrupt the burning operation. The removal of these disturbing constituents from the burning operation is difficult, and involves losses of heat and material.

With the process according to the invention, the kiln is charged with raw flour which is practically completely deacidified. The clinker-forming reaction is exothermal. It amounts to about 100 kcal/kg of clinker. This requires heating of the material being calcined in the kiln to about 400°C, solely by this reaction. Consequently, only approximately 200 kcal/kg of clinker are to be supplied by the burner in the kiln for the radiation losses of the kiln and the condenser losses. This heat quantity is approximately a quarter of the heat quantity which is used in the kiln with the otherwise usual processes. The quantity of gas which has to pass through the kiln is consequently reduced accordingly. Since, in addition, the deacidification with the forming carbon dioxide in the kiln is dispensed with, the capacity of gas through the kiln is only about 20% of the capacity of a kiln which is operated in accordance with the prior art. By this means, the maximum kiln capacity is to be raised from $M = 1.7554 \cdot V_1 (t/24)$ 7 to $8.5 \cdot V_i (t/24)$. This means that a kiln assembly constructed in accordance with the process of the invention has to have only a volume $V_i$ of about one fourth to one fifth of that, which is considered necessary according to the prior art.

Although the invention relates mainly to the deacidification of the raw flour in a separate heat exchanger with waste air from the cooler or condenser and fuels, such as coal, oil or gas, some of the heat in the heat exchanger can also be introduced by low-grade fuel, such as oil shale, mine waste or bituminous limestone.

An additional advantage of the process, according to the invention, is the reduction in the radiation losses of the kiln. Because the kiln surface is reduced approximately to half for the same capacity, the loss by radiation is reduced to half while keeping the same kiln wall temperature.

An additional advantage of the process according to the invention is that far fewer disruptions in the calcining operation occur because of ring formation and excessive deposits than in the conventional processes.

It has in fact been established that, in the conventional processes, fine dust which is entrained from the condenser, is heated to extremely high temperatures in the kiln by the flame. In the rearward sections, then, this dust forms extremely hard deposits from the molten state in association with which has not yet been burnt to clinker form. Now, since the gas velocities in the system according to the invention are substantially lower, substantially no dust particles are carried into this zone of the kiln, so that these disruptions are substantially prevented.

A particular advantage of the process, according to the invention, is that increase in capacity of existing kiln assemblies is possible at low cost. For this purpose, using an existing heat exchanger kiln, another and possibly smaller heat exchanger is fitted to this kiln. The waste gases from the kiln are conducted through this exchanger. The existing heat exchanger is connected to the existing condenser and is provided, according to the present invention, with burners, with the air for combustion being derived from the condenser. Depending on how the original heat exchanger has been designed, and how high the capacity of the condenser is, the kiln output can be doubled or trebled by this arrangement. It has also been found advantageous, in this respect, to leave the existing heat exchanger as the one connected after the kiln, and to arrange a new and larger heat exchanger in front of the kiln. With suitable efficiency of the condenser, it is possible with such a procedure to perhaps quadruple the kiln output.

The outputs of large rotary kilns which can be achieved at the present time are approximately 4000 tons of clinker in 24 hours. Since already kilns having diameters larger than 6 meters have to be constructed for these outputs, increasing this output is no longer possible by means of larger kilns. Instead, th process according to the invention must be used.

The separation, in accordance with the invention, of the harmful constituents with some of the hot waste gases from the kiln though a by-pass, offers a particular advantage. Thus, since it has been found surprisingly that if the kiln is charged with deacidified material, there is substantially no development of dust in the kiln. Furthermore, added to the reduced gas velocity in the kiln and the higher concentration of the harmful constituents in the kiln waste gas, caused by the small gas quantity, there is the advantage that scarcely any raw material is lost with these waste gases.

The process according to the invention is hereinafter described by reference to the accompanying drawings.

DESCRIPTION OF THE PREFERRED EMBODIMENTS

Figure 1:
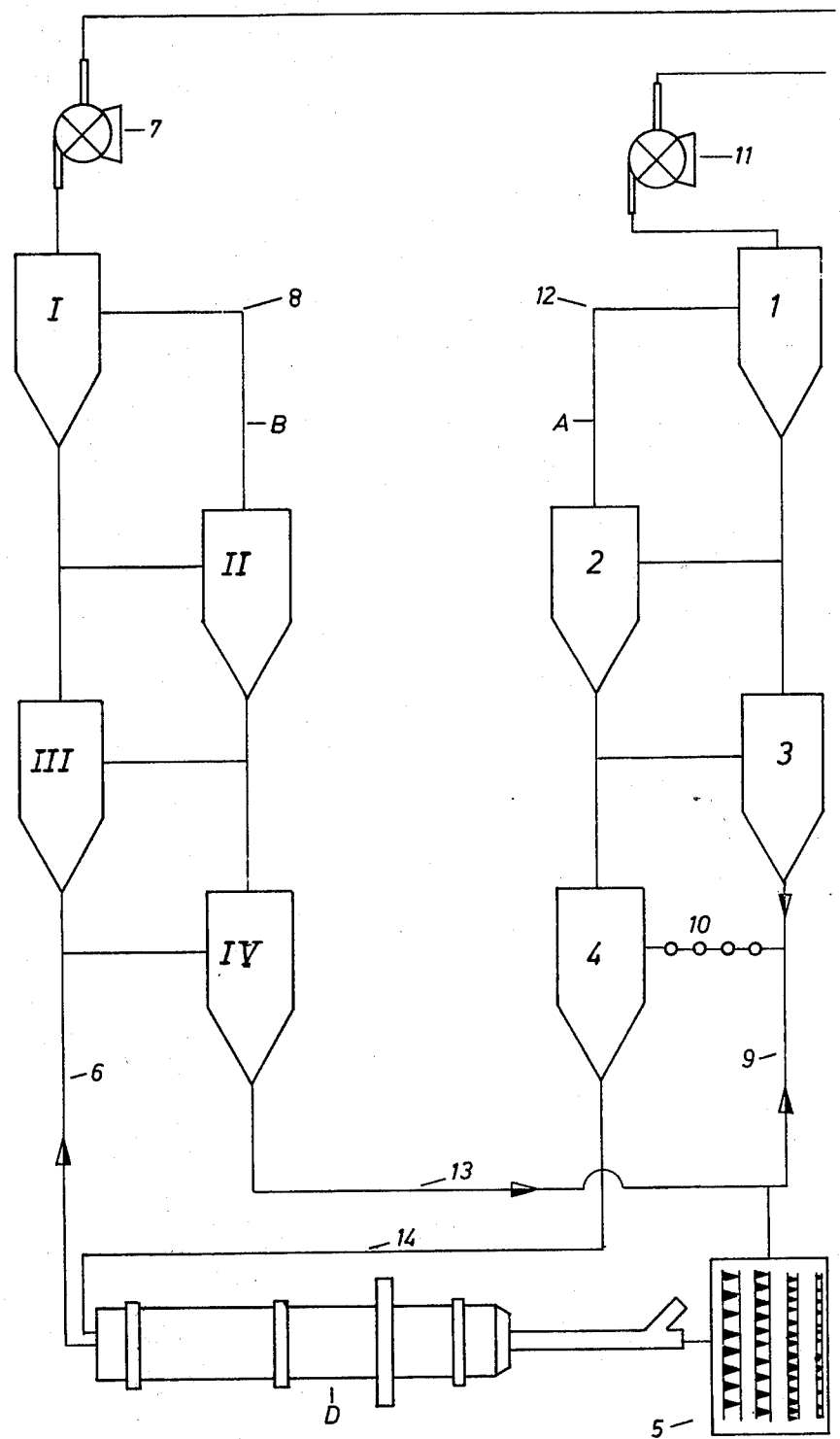
FIG. 1 is a diagrammatic elevational view of a rotary kiln installation with two heat exchangers arranged after the rotary kiln, for carrying out the process according to the present invention.

According to FIG. 1, two heat exchangers A and B, each consisting of four series-connected cyclones 1, 2, 3 and 4 or I, II, III and IV, are arranged before the rotary kiln D, and a condenser 5 is arranged following it. The waste gases of the rotary kiln are supplied through a pipe 6 to the second-mentioned heat exchanger B and withdrawn at the top therefrom by a fan 7. A part of the raw flour quantity or clay component required for the production of the clinker is supplied to the heat exchanger B at thee top at 8. The larger quantity of the raw powder or the high-percentage limestone powder, required for producing the clinker, is supplied to the heat exchanger A at the top at 12.

The first-mentioned heat exchanger A is heated by the hot waste air from the condenser 5 and by the combustion of fuel in the burners 10. The hot condenser waste air is conveyed through the pipe 9 to the burners 10. The gases for combustion of the burners 10 flow into the lowermost cyclone 4 of heat exchanger A and are finally extracted by the fan or blower 11 from the top of the heat exchanger. The clay component leaving the lowermost cyclone IV of the heat exchanger B, is introduced through the pipe 13 into the exhaust gas air pipe 9, and passes with the latter and the powdered limestone delivered to the heat exchanger A, to the burners 10. From there the flows is into the lowermost cyclone 4 of the heat exchanger A. The clay component and the powdered limestone are mixed in the cyclone 4, and the mixture is then supplied through the pipe 14 to the rotary kiln D.

Figure 2:
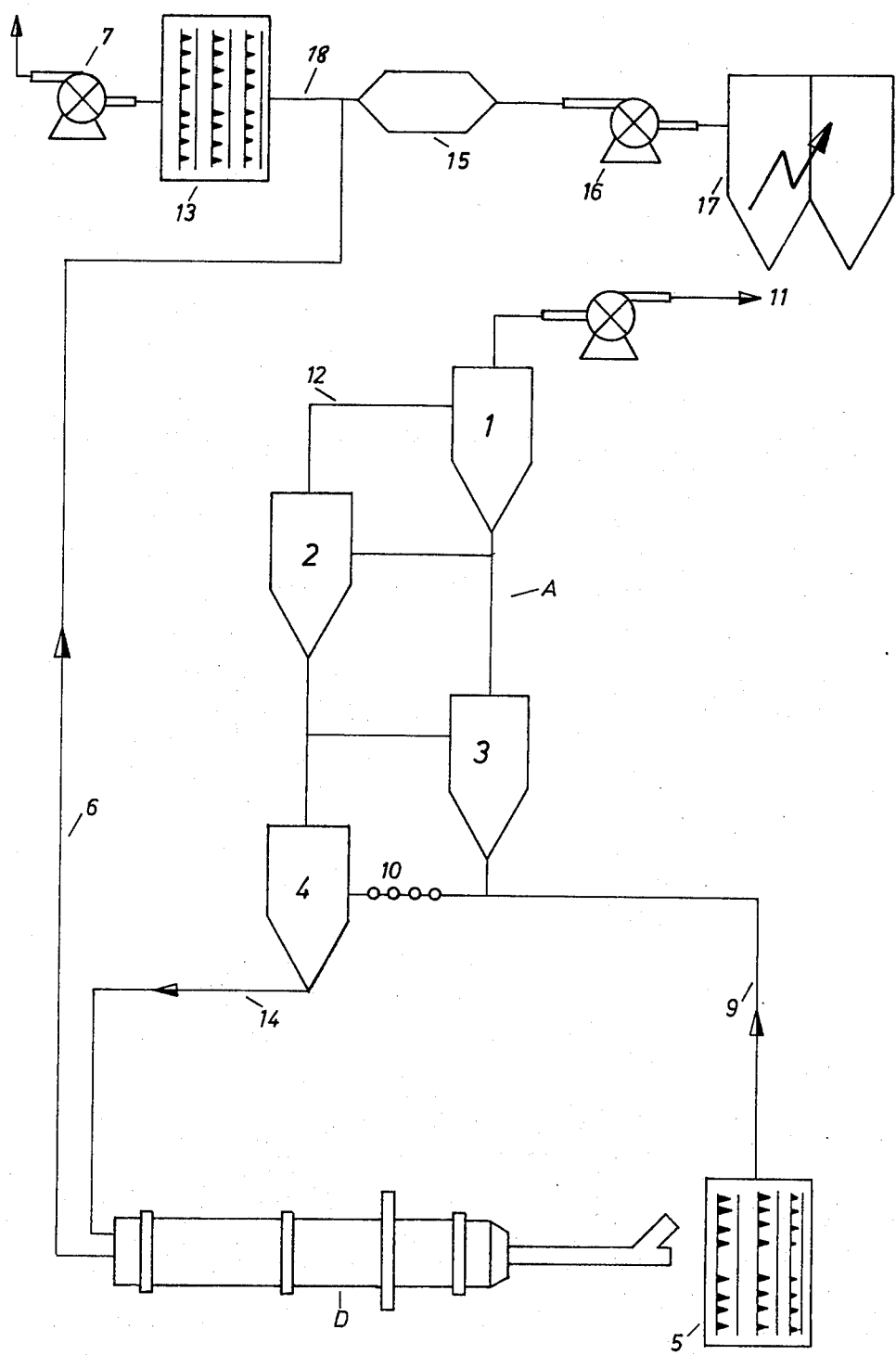
FIG. 2 is a diagrammatic elevational view of another rotary kiln installation with a single heat exchanger arranged after the rotary kiln, for carrying out the process according to the invention.

According to FIG. 2, the heat exchanger A consisting of four series-connected cyclones 1, 2, 3 and 4 is connected on the input side of the rotary kiln D and a condenser 5 is connected on the output side. The hot air leaving the condenser is conveyed through the pipe 9 to one or more burners 10. The gases for combustion of burners 10 enter the lowermost cyclone 4 of the heat exchanger A together with the material supplied at the top 12 to the heat exchanger. The deacidified material then flows through the pipe 14 from the lowermost cyclone 4 into the rotary kiln. The condenser air is drawn off by the fan 11 from the uppermost cyclone 1.

The waste gases of the rotary kiln flow through the pipe 6 towards the outside, partly by way of a condenser 13 and a fan 7. They are also used partly for the drying at 15, and are then conveyed outward by means of a fan 16 through an electrofilter 17.

In the following examples, the basis of the comparison is a conventional rotary kiln installation for producing Portland cement clinker, as hereinafter described:

The kiln is to have an output of 1500 tons of clinker per day. According to the formula $M = 1.7554 \cdot V_i$ (t/24 hours), the kiln has to have an internal volume of about 850 cubic meters. The internal diameter is to amount to 4 m and the length 68 m. The heat consumption is 800 kcal/kg of clinker, which is supplied by a burner in the outlet of the kiln. For this purpose, it is necessary to have an hourly heat consumption of $50 \times 10^6$ kcal. With a caloric value of the fuel (heavy fuel oil) of about 10,000 kcal,kg, 5,000 kg of oil per hour have to be burnt, therefore, in the outlet portion. An amount of 13.5 cubic meters of air with an air excess factor of $n - 1.2$ are required for the combustion operation, per kg of fuel. The amount of air required per hour is then 69,000 cubic meters. This air for combustion is derived from the following grid condenser at a temperature of about 850°C. The hourly quantity of smoke gas is then about 71,000 cubic meters. In addition, there are about 27 tons of carbon dioxide gas (about 80% of the carbon dioxide is driven out of the raw material, the remainder of the carbon dioxide is driven out in the heat exchanger). The carbon dioxide produces a gas quantity of about 14,000 cubic meters. The total gas quantity which has to be passed through is, therefore, 85,000 cubic meters. The outlet temperature of the gases from the kiln is about 1200°C and the gas temperature after the heat exchanger is about 340°C. The quantity of raw powder delivered to the heat exchanger is 2320 tons per day or 96.7 t/h.

Example 1

If the kiln system according to the present invention and as described above is used, the heat exchanger A is only charged with hot waste air from the condenser. Since about 600 kcal/kg of clinker have to be produced in the heat exchanger A, 3775 kg of oil are here to be burnt every hour. For this purpose, about 52,000 cubic meters of hot air are taken from the condenser. It is to be borne in mind in this connection, that the preheated raw powder from cyclone stage IV of the heat exchanger B, is brought together with the flow of material from the ccyclone 3 of the heat exchanger A in the gas pipe to the cyclone 4 of the heat exchanger A. For producing the residual 200 kcal/kg of clinker in the kiln, it is necessary to burn 1285 kg of oil per hour. For this purpose, about 17400 cubic meters of hot air air are taken from the condenser. The smoke gas quantity in the kiln is then 17,700 cubic meters per hour. Since the deacidification proceeds in the heat exchanger A, this gas quantity is not increased by the carbon dioxide which is driven off. Accordingly, it is still only 21% of the gas quantity to be passed through when operating in the conventional manner. No particular heat balance has to be established for heat exchanger B, when the flow of material emerging from cyclone IV is introduced into the supply pipe to cyclone 4, since all the deacidifying heat which is to be supplied is provided here. Since the fuel heat flow $Q_{Br} = 0.75 \cdot 10^6 \cdot D_i^3$ (kcal/h) determines the size of the kiln, and since this fuel heat flow amounts to about one fifth of the kiln operated by the conventional process, the volume of the kiln which is described in this example, also has to be only about one fifth of the volume which is otherwise normally required. Thus, with this process, a kiln volume of about 170 cubic meters will be sufficient. The kiln must then have an internal diameter of about 2.50 m and a length of about 28 m.

The kiln operated by the conventional process has an internal diameter of 4 m. Since the kiln has a refractory lining, the external sheet metal diameter amounts to about 4.40 m. The kiln then has a surface of 950 m². With the kiln as described in the example, the internal diameter is 2.50 m, the sheet metal diameter is 2.90 m, and the length is 28m. The surface here amounts to 255 m², i.e. about 27% of the surface of the conventional kiln. The losses by radiation are consequently reduced to about 30% of those of a conventional kiln. If the radiation losses of a conventional kiln can be assumed as being 75 kcal/kg of clinker, the radiation losses of the kiln, according to the invention, are only about 27.5 kcal/kg of clinker. Accordingly, about 50 kcal/kg of clinker have been saved.

If the raw material used for the production of the clinker contains, for example 2% of alkalis, of which half are to be removed, then it would be necessary, when separating by a by-pass with the conventional process, to discharge half of the waste gas. As a result there would be lost such a large quantity of dust and heat, that this process cannot be economical. The only solution heretofore was for the by-pass only to be brought into operation at intervals, in order to increase the concentration of harmful constituents over a relatively long time interval.

With the process according to the invention, only about 20% of the gases are still sent through the kiln, and consequently the concentration of harmful constituents in these gases is about five times higher. If, again, it is desired to remove half of the alkalis, then of the 17,700 cubic meters which are now flowing through the kiln, only half, namely, about 9000 cubic meters, have to be diverted. Consequently, it is no longer necessary, for producing a cement with a low alkali content, to wait until the gases are saturated with harmful constituents. Thus, these constituents can be immediately removed by branching off a relatively small gas quantity.

Example 2

The previously described conventional kiln with a clinker output of 1500 t/day is to be used again for comparison purposes. The output of the kiln is to be trebled.

In this case, the existing heat exchanger is left as heat exchanger B. A new heat exchanger A is mounted on, and through which it is possible to pass approximately the raw material for 3000 tons of clinker. Obviously, if such a heat exchanger for 3000 tons of clinker is too large, the heat exchanger A can also be subdivided into two heat exchangers. In this case, each heat exchanger will have its own fan, and also its own burner as well as its own hot air supply from the condenser.

For a capacity of 4500 tons per day of clinker, it is necessary for 11,400 kg of oil to be burnt per hour in the heat exchanger A. The original heat exchanger becomes the heat exchanger B and is charged with quantity of raw powder for 1500 tons of clinker. It is then also necessary to burn 3850 kg of oil per hour in the kiln. In this case, $M = 5.3 \cdot V_i$ ($t/24$ h). The radiation losses are reduced, since the surface temperature remains the same or drops to about 25 kcal/kg of clinker. Accordingly, once again about 50 kcal/kg of clinker are saved.

Example 3

The kiln referred to in Example 2 is to be operated without a heat exchanger B. In this case, a second or even a third heat exchanger is associated with the existing heat exchanger. All three heat exchangers have their own controlled waste gas fan and their hot air supply lines from the condenser. They have also their own burners. The heat exchangers are so uniformly operated that each has its own crude powder distribution and the waste gas fans are so regulated that the same flows of waste gas are established Since, also, the supply of fuel to the three heat exchangers is the same, all operate under the same conditions. An amount of 3800 kg of oil per hour are burnt in each heat exchanger. The conditions in the kiln are not changed. Every hour, about 53,000 cubic meters of gas leave the kiln at a temperature of about 1200°C. With a specific heat of this gas of 0.35 kcal/Nm³°C and with possible utilization of the heat up to 150°C in a grinding and drying operation, $19.3 \cdot 10^6$ kcal in these gases can be used for drying purposes. With a requirement of 1000 kcal/kg of water in a grinding and drying operation, $19.3 \cdot 10^3$ kg of water can be driven off with these gases.

For the production of clinker as mentioned above, it is necessary per hour to grind 290 tons of raw material. If this raw material contains about 6.5% of moisture, the heat content of the hot kiln waste gases is sufficient for achieving the drying. The heat exchanger B is unnecessary in this case. The quantity of raw material is here only supplied to the heat exchanger or exchangers A, so that in addition to saving the heat exchanger B, there is also a lowering of the waste gas temperature in the heat exchanger A.

If, in this example, half of the harmful constituents are to be removed trough a by-pass, it is necessary for about 26,500 m³ of the 53,000 m³ which leave the kiln at a temperature of about 1200°C, to be branched off through a by-pass. The residual gas quantity would then, however, be sufficient for drying the raw material required for operating the kiln in a grinding and drying arrangement, if this raw material still has 3.5% of moisture.

We claim:
1. A process for the heat treatment of components of a raw material in dust form so as to produce cement clinkers in an installation comprising a first and a second heat exchanger for preheating the raw material, a rotary kiln supplied with the combined preheated material from said heat exchanger, and a condenser for cooling the material delivered from said kiln, said process comprising the steps of:
   1.
      a. supplying a first component of the raw material to said first heat exchanger;
      b. supplying a second component of the raw material to said second heat exchanger;
   2.
      a. supplying waste gases from said rotary kiln to said first heat exchanger for heating the raw material component therein; (b) supplying waste gases from said condenser to said second heat exchanger; (c) supplying additional fuel to a burner in said second heat exchanger;
      d. conveying the heated first raw material component from said first heat exchanger into said heated second heat exchanger for admixing with said second raw material component and the waste gases from said condenser; (e) subjecting said admixed raw material components and condenser waste gases to heat from said burner; and
   3. carrying out substantially all endothermal process in said second heat exchanger with said admixed raw material components while producing in said rotary kiln only the heat quantity necessary for reaching and maintaining the process temperature.

2. A process as claimed in claim 1, each of said heat exchangers respectively consisting of a plurality of cyclones.

3. A process according to claim 1, wherein two heat exchangers are connected on the input side of said rotary kiln, and including the steps of supplying one of said two exchangers with waste air from the condenser; supplying the other exchanger with the waste gases from said rotary kiln; carrying out said endothermal processes in the heat exchanger supplied with the waste air from the condenser, said air supporting the combustion of the fuel heating said one exchanger; delivering raw material to said other heat exchanger supplied with waste gases from said rotary kiln; and thereafter supplying heat-treated material to said one heat exchanger.

4. A process according to claim 3, including the step of charging said other exchanger with a quantity of said raw material component so that there is no deacidification of the powder, and so that sulphur dioxide contained in the raw material for forming said cement clinker is not combined and can be removed subsequently from the gases.

5. A process according to claim 3, including the step of supplying high-percentage powdered limestone as the second raw material component to said second heat exchanger heated with the waste air from the condenser, said heat exchanger having upper and lower portions; supplying clay component as the first raw material component required for production of clinker to said first heat exchanger heated with the waste gases from said kiln; introducing thereafter the high-percentage powdered limestone and clay component into a supply pipe for combustion air coming from the condenser and leading to said burner; and carrying out homogenisation of the mixture in said supply pipe and the lower portion of the heat exchanger operated with waste air from the condenser.

* * * * *